No. 737,167. PATENTED AUG. 25, 1903.
J. B. SMITH.
PLOW.
APPLICATION FILED NOV. 15, 1902.
NO MODEL.
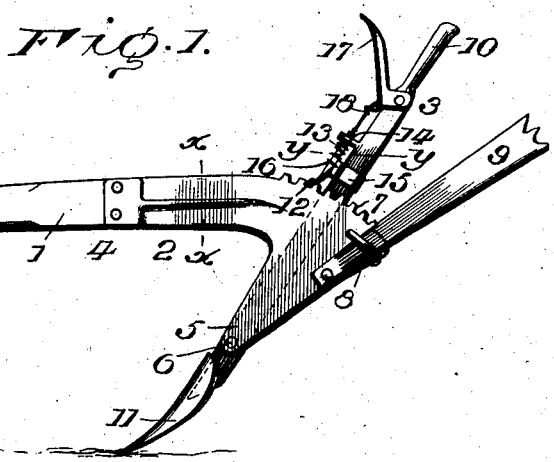
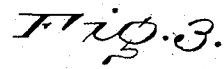
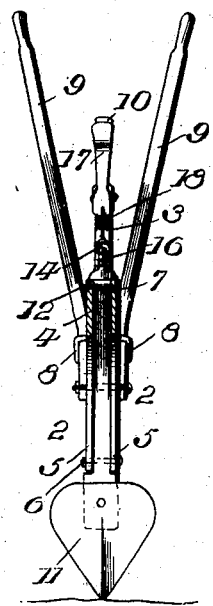
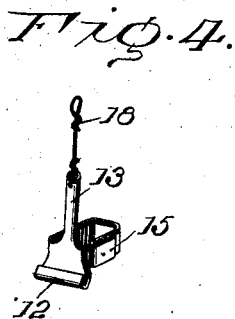
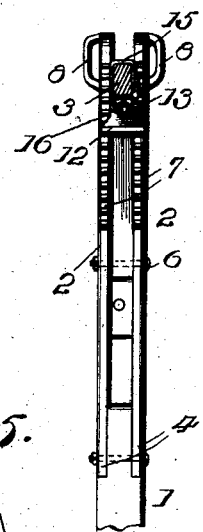
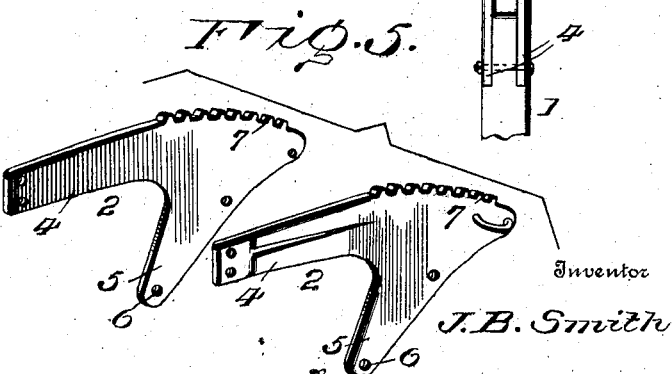
Witnesses
Inventor
J. B. Smith No. 737,167. Patented August 25, 1903.

UNITED STATES PATENT OFFICE.

JAMES B. SMITH, OF SAN SABA, TEXAS.

PLOW.

SPECIFICATION forming part of Letters Patent No. 737,167, dated August 25, 1903.

Application filed November 15, 1902. Serial No. 131,582. (No model.)

*To all whom it may concern:*

Be it known that I, JAMES B. SMITH, a citizen of the United States, residing at San Saba, in the county of San Saba and State of Texas, have invented certain new and useful Improvements in Plows; and I do hereby declare the following to be a full, clear, and exact description of the invention, such as will enable others skilled in the art to which it appertains to make and use the same.

This invention has relation to plows and provides an attachment of novel construction to be applied to any style or make of plow or cultivator and particularly to be used in connection with the form of plow generally known as the "Georgia" plow, the invention also being applicable to a double-shovel plow or cultivator. In the drawings the invention is shown applied to an ordinary plow-beam, although, as stated, it is not designed to restrict it to such use.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of a plow embodying the invention. Fig. 2 is a section on the line X X of Fig. 1 looking to the rear. Fig. 3 is a plan view of the standard, the adjustable stock being shown in section on the line Y Y of Fig. 1. Fig. 4 is a detail view in perspective of the latch, keeper, and guide. Fig. 5 is a detail perspective view of the beam-standard.

Corresponding and like parts are referred to in the following description and indicated in all the views of the drawings by the same reference characters.

The attachment consists, essentially, of a beam-standard and a plow-stock, the beam-standard being attached to a beam 1 and comprising companion members 2. The members 2 are transversely spaced, so as to receive between them the beam 1 and the plow-stock 3, the latter being free to move in the space formed between the said members. The beam-standard comprises a forwardly-extending part 4 and a downwardly-extending part 5, the lower end of the latter being made rounding to form a knuckle-joint with the lower end portion of the plow-stock. The plow-stock 3 is pivoted to the lower end of the beam-standard at 6, and the upper rear portion of the beam-standard is formed on the arc of a circle having the pivot-fastening 6 as a center and is toothed, as shown at 7, for coöperation with a latch applied to the plow-stock to hold the latter in an adjusted position. Lateral loops 8 are provided at the upper rear portion of the beam-standard and receive the handles 9, which are fitted therein and otherwise secured at their lower ends to the beam-standard.

The plow-stock 3 consists of a bar having its upper end shaped to form a handle 10, which projects a considerable distance above the top of the beam-standard in order to provide ample leverage to admit of easy adjustment of the plow-stock to regulate the pitch of the shovel 11. The lower end of the plow-stock is widened, so as to come about flush with the outer sides of the beam-standard. The upper ends of the side extensions are cut away to correspond with the lower rounded ends of the members 2, so as to form a snug joint therewith. The plow-stock passes between the members or parts 2 of the beam-standard and is braced laterally thereby. The shovel 11 may be of any variety, according to the nature of the work for which the plow or cultivator is designed, and is secured to the lower widened end of the plow-stock in any desired way. The plow-stock is held in an adjusted position by means of a latch 12, coöperating with the teeth 7 and slidably mounted upon the stock. The latch 12 is sufficiently wide to span the space formed between the members 2 and engage with the teeth 7 of the said members, and its upper end is reduced to form a stem 13, which passes through a guide 14, forming a part of or applied to the plow-stock 3. A keeper 15, forming a part of the latch, embraces the plow-stock and coöperates with the stem 13 and guide 14 to direct the latch in its vertical movements and retain it in place. A spring 16 is mounted upon the stem 13 between the latch 12 and guide 14 and serves to hold the latch in engagement with the teeth 7. The latch-lever 17, pivoted to the upper portion of the plow-stock, is connected by a link 18 with the stem 13. When the latch-lever 17 is pressed upon, the latch 12 is withdrawn from engagement with the teeth 7, and the plow-stock can be moved forward or rearward about the pivot 6, so as to vary the pitch of the shovel or plow and cause it to run to a greater or less depth, according to the nature of the soil and condition of work.

The beam-standard is of such construction as to be pressed or formed in any convenient manner and may be applied to a Georgia plow or any design of double-shovel plow or cultivator, as may be desired.

Having thus described the invention, what is claimed as new is—

1. In a plow or cultivator, a beam-standard having its upper rear portion toothed, a plow-stock pivoted to the lower rear portion of the standard and extended at its upper end to provide a handle, and a latch applied to the upper portion of the plow-stock for coöperation with the toothed portion of the beam-standard to secure the plow-stock in an adjusted position, substantially as set forth.

2. In a plow or cultivator, a beam-standard comprising corresponding side members transversely spaced and having their upper rear portions correspondingly curved and toothed, a plow-stock pivoted between the parts of the beam-standard and having its upper end extended to form a handle, and means coöperating with the standard teeth whereby the stock may be secured in an adjusted position, substantially as described.

In testimony whereof I affix my signature in presence of two witnesses.

JAMES B. SMITH. [L. S.]

Witnesses:
R. W. BURLESON,
J. H. MCMULLAN.